United States Patent
Bhunia et al.

(10) Patent No.: US 10,521,600 B2
(45) Date of Patent: Dec. 31, 2019

(54) RECONFIGURABLE SYSTEM-ON-CHIP SECURITY ARCHITECTURE

(71) Applicant: University of Florida Research Foundation, Inc., Gainesville, FL (US)

(72) Inventors: Swarup Bhunia, Gainesville, FL (US); Atul Prasad Deb Nath, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 93 days.

(21) Appl. No.: 15/840,509

(22) Filed: Dec. 13, 2017

(65) Prior Publication Data
US 2019/0180041 A1  Jun. 13, 2019

(51) Int. Cl.
G06F 17/50 (2006.01)
G06F 21/62 (2013.01)
G06F 13/28 (2006.01)

(52) U.S. Cl.
CPC .............. *G06F 21/62* (2013.01); *G06F 13/28* (2013.01); *G06F 17/5054* (2013.01); *G06F 2213/0038* (2013.01)

(58) Field of Classification Search
USPC ......................................................... 716/138
See application file for complete search history.

(56) References Cited

U.S. PATENT DOCUMENTS

| 2016/0191512 A1* | 6/2016 | Tatourian | H04L 63/0861 726/7 |
| 2017/0076116 A1* | 3/2017 | Chen | G06F 21/85 |
| 2017/0155511 A1* | 6/2017 | Haridas | H04L 9/0841 |

* cited by examiner

*Primary Examiner* — Bryce M Aisaka
(74) *Attorney, Agent, or Firm* — Thomas | Horstemeyer, LLP

(57) ABSTRACT

Aspects of system-on-chip (SoC) security architecture that supports systematic and efficient implementation, validation, and in-field upgrade of security policies are described. In one example, an apparatus can include at least one intellectual property (IP) core, a centralized reconfigurable security policy engine (RSPE) and at least one security wrapper. The RSPE implements actionable constraint based on a security policy and at least one event frame. A security wrapper is associated with an IP core. The security wrapper is configured to communicate an event frame to the RSPE in response to an event.

20 Claims, 6 Drawing Sheets ns have proven grossly inadequate to address these requirements, due to (a) high energy cost, (b) lack of in-field configurability, and (c) vulnerability against a number of hardware-level attacks including fault and side-channel attacks.

RECONFIGURABLE SYSTEM-ON-CHIP SECURITY ARCHITECTURE

BACKGROUND

It can be highly challenging to validate a system against security policies, or to update system-level security requirements during operation in field e.g., in response to changing customer needs. To exacerbate the issue, security policies are rarely specified in any formal, analyzable form. Some policies are described in natural language in different architecture documents, and many remain undocumented. Implementing, updating, and analyzing diverse SoC security policies can be daunting. Traditional implementations are often ad-hoc, lack a systematic process, and can impose a significant costs, energy, and area overhead, and do not provide system-on-chip (SoC) security architectures with built-in resilience against unauthorized access to diverse security-critical assets inside SoC (e.g., keys for cryptographic operations, digital right management keys, programmable fuses, sensitive user data etc.).

BRIEF DESCRIPTION OF THE DRAWINGS

Many aspects of the present disclosure are better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
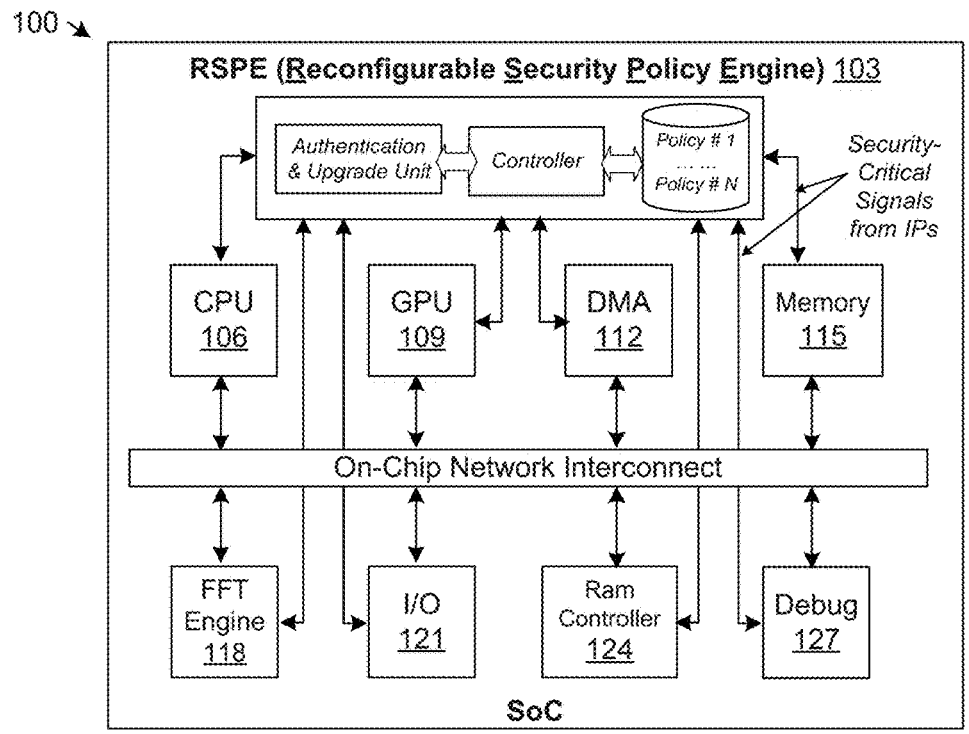
FIG. 1 illustrates an example SoC that includes a centralized Reconfigurable Security Policy Engine (RSPE), according to the present disclosure.

The present disclosure generally relates to a reconfigurable System-on-Chip (SoC) security architecture. This infrastructure involves a flexible, adaptable, and in-field upgradable SoC security architecture and computer-aided design (CAD) framework that enable secure and seamless implementation, and upgrade of SoC security policies through "Hardware Patching". A centralized security policy engine and the associated CAD flow enable efficient implementation and validation of diverse security policies. Further, they support a "patchable" hardware technology, i.e., a hardware implementation of security requirements through a reconfigurable hardware such as field programmable gate array (FPGA), which is used to realize the centralized module. The building blocks of the proposed architecture are (1) a centralized Reconfigurable Security Policy Engine (RSPE), (2) smart security wrappers around the intellectual property (IP) blocks, and (3) Design-for-Debug (DfD) infrastructure interface with the RSPE and security wrappers. The technology provides a systematic approach to represent and synthesize diverse security policies with pragmatic application in modern SoC designs including mobile and embedded systems, automotive systems, and Internet-of-Things (IoT) devices. The hardware patchability results demonstrate, for the first time, that it is possible to achieve infield configurability of security requirements without incurring significant cost in energy, performance, or area.

The System-on-Chip (SoC) security architecture and CAD framework will aid developing a robust and adaptable architecture for SoC security policies of IoT devices. Hence, the technology will ensure the confidentiality, integrity, and availability of diverse on-chip security assets. The architecture addresses design requirements including infield configurability and low overhead of IoT. The flexible and adaptable security architecture is implemented on a reconfigurable hardware through a centralized policy control module. The architecture and the associated CAD flow enable "patchable" hardware, i.e., a hardware implementation of security requirements that can be seamlessly, and securely upgraded, and adapted infield. Compared to traditional approaches, the aspects of the present disclosure provide a dedicated plug-and-play infrastructure IP for centralized control over the security policies of the entire SoC; "Patchable hardware" for seamless, and secure upgrade, and adaptation of real-time policies without incurring significant cost; and minimized energy, performance, and area overhead in comparison to traditional implementations. The implementation improves over a traditional distributed implementation of security policies by almost an order of magnitude in performance and energy costs.

The Internet-of-Things (IoT) has led to a new era of computing characterized by an explosive growth in the smart, connected devices. The growth is expected to continue at an even faster rate, with estimates of 50 to 75 billion connected devices by 2020 and running into trillions within a decade more [1], —representing the fastest growth for any sector in the history of our civilization. Security is clearly a critical component of computing devices targeted towards IoT applications. In particular, IoT devices have access to a large amount of sensitive assets which must be protected from unauthorized or malicious access. These include both personalized end-user information (e.g., contacts, location, browsing pattern, health information) as well as confidential collateral from architecture, design, and manufacturing, (e.g., cryptographic and digital rights management (DRM) keys, fuses, debug instrumentation, defeature bits). Consequently, security architecture, i.e., mechanism to ensure protection of sensitive assets from malicious, unauthorized access, is a component of modern System-on-Chip (SoC) designs targeted towards IoT applications.

There has been significant work on robust SoC security architecture, both in academic research and in industrial practice. Unfortunately, they are difficult to adapt to IoT applications. In particular, most IoT applications impose two constraints: (1) infield configurability to adapt to changing security requirements; and (2) operation under a constrained boundary of energy and performance profiles.

Traditional distributed implementation using custom logic or microcontroller units (MCU) based implementations may incur significant overhead in terms of energy and area cost, making them unsuitable for many IoT applications such as wearables, implants, and infrastructure devices. Even for high-end systems such as automotive electronic control units, software implementations are often not viable: these systems must enforce aggressive real-time requirements for detecting infield security violations and performing mitigatory actions, which are difficult to enforce with software. Consequently, there is a strong need to develop a hardware-based security architecture implementation, that can provide infield configurability while permitting enforcement of performance, energy, and real-time constraints.

The present disclosure involves a security architecture that is designed from the bottom up to address the IoT application constraints, together with a methodology for implementing security policies in this architecture. This enables seamless and secure upgrade of security policies post-silicon and infield, while addressing the performance and energy requirements. This enables an approach to developing "hardware patch," i.e., hardware implementation of security requirements that permit seamless post-silicon adaptation and upgrade.

A patching architecture according to the present disclosure can include (1) a plug-and-play, flexible infrastructure IP called Reconfigurable Security Policy Engine (RSPE) to implement SoC security policies; (2) a standardized security wrapper architecture that enables communication of security-relevant events between various IPs in the SoC design and RSPE; and (3) a seamless interface between security wrappers and the on-chip SoC debug interface to enable requirements upgrade. The framework helps to achieve flexibility and adaptability in terms of security policy implementation.

The present disclosure involves a security architecture implementation, developed from the bottom up to enable hardware patching of security requirements. Diverse SoC security policies can be implemented via this architecture, and it is possible to adapt, modify, and upgrade these policies in field. The present disclosure also involves an automatic security mapping flow, providing a streamlined methodology for compiling high-level security policy definitions into the framework. Finally, the present disclosure further involves comprehensive quantitative analysis of energy, performance, and area overhead of the architecture realized with embedded FPGA. This approach is viable as a foundation for patchable hardware, e.g., it improves over a traditional implementation of security policies by almost an order of magnitude in performance and energy costs.

SoC security is driven by the requirement to protect on-chip assets against unauthorized access. The assets in an SoC design include cryptographic and DRM keys, premium content, de-featuring bits, configuration fuses as well as personal end user information, which are sprinkled across different IP blocks. Access control can be defined by confidentiality, integrity, and availability requirements. A security policy can map the requirements to actionable design constraints that can be used by IP implementers or SoC integrators to develop protection mechanisms. Following are two examples for an SoC. Example 1: During boot, data transmitted by the crypto engine cannot be observed by any IP in the SoC fabric other than its intended target. Example 2: A secure key container can be updated for silicon validation but not after production. Example 1 is a confidentiality requirement while Example 2 is an integrity constraint. The policies provide definitions of (computable) conditions to be satisfied by the design for accessing a security asset. Furthermore, these may vary depending on the state of execution (e.g., boot time, normal execution, etc.), or position in the development life-cycle (e.g., manufacturing, production, etc.). In addition to access control, security policies can capture requirements from information flow, liveness, time-of-check vs. time-of-use (TOCTOU), etc.

One goal of SoC security architecture is to implement the security policies outlined above. For each asset, the architects can identify (1) who can access the asset, (2) what kind of access is permitted by the policies, and (3) at what points in the system execution or product development life-cycle such access requests can be granted or denied. The process can be highly complex and tedious for several reasons. Note that not all assets are statically defined; many assets are created at different IPs during the system execution. Architects can use various architectural and system artifacts (e.g., fuses, firmware, etc.) creatively to realize them in practice. SoC designs provide Trusted Execution Environments (TEE) to facilitate implementation of access control requirements; TEEs include a combination of hardware support (e.g., secure operating modes, virtualization), and software mechanisms (e.g., context switch agents, integrity check) which can be used to enforce isolation of sensitive data based on the necessity of access control.

Since different SoC security policies involve diverse II's, their implementation can be sprinkled across the entire SoC design. Furthermore, the implementation can rely on manual, creative insight of human architects; consequently, each policy is implemented differently in an ad hoc manner using a variety of architectural and hardware features and primitives. This makes it hard to develop methodologies for infield patchability of these requirements. In practice, some security features (or implementation artifacts) are designated as potentially requiring infield update. These can be implemented carefully either through software/firmware or using a reconfigurable hardware fabric. However, this approach requires that artifacts needing such updates are relatively few, and also clearly identified in advance; it cannot accommodate adaptation of security requirements based on unanticipated circumstances, which may potentially involve multiple IPs and require comprehensive changes in architecture and implementation. When unanticipated modifications are required in practice today, they are handled primarily through designer ingenuity, typically making use of a combination of firmware updates, complex defeaturing, etc. Given the complexity of these approaches, it is unsurprising that they themselves can introduce further security loopholes ultimately leading to untrustworthy, vulnerable, and even functionally fragile products.

Motivation for infield hardware patching can be illustrated using test cases. Case I: Attack on Confidentiality. The attack scenario consists of two IPs, namely a trusted crypto engine IP A and an untrusted third-party IP B. Ideally, the security policies to set the access control of different IPs are defined at the risk assessment phase. In practice, however, the policies can go through continuous refinement through different phases of SoC integration. In some cases, the process gets extended to early design and implementation activities as new knowledge and constraints keep coming to light. Consequently, the security architects fail to implement a definitive information flow policy to map the IP-specific design constraints at the time of product launch i.e. time t=0.

Further, the architects connect several IPs in same network-on-chip (NoC) in SoC with crypto block due to resource constraints and mark the IPs as "safe" to observe part of the keys being exchanged in the communication fabric. Being connected to the same communication fabric as the crypto engine, the untrusted IP B can be exploited by adversaries at a later time t in device life cycle to violate the information flow policy. For instance, the adversary can revoke Key Obliviousness, i.e. exploit the malicious IP B to infer cryptographic keys by snooping data from crypto engine on the low-security communication fabric and gain illegal access breaching the confidentiality of the design. One technique to mitigate such an attack can include the rigorous task of overhauling and upgrading the firmware.

Case II: Attack on Integrity. This attack scenario consists of an adversary attempting to launch a code injection attack through a malicious or rogue IP by overwriting code segments via direct memory access (DMA). For instance, the attacker can exploit the System Management Interrupt (SMI) handler to write to an address inside System Management RAM (SMRAM), which is basically part of DRAM reserved by BIOS SMI handlers. Based on the vulnerability, the adversary may have control over the address to write, the value being written, or both. Preventive measures to thwart such attacks include identifying memory access requests to DMA-protected regions, and setting up mechanisms to bar DMA requests to all protected accesses.

In the aforementioned attack scenarios, the existing approaches of mitigation fail to offer infield adaptation of hardware as it involves multiple IPs and require comprehensive changes in architecture and implementation. The proposed architecture, on the other hand, is capable of overcoming these limitations by enabling efficient and secure upgrade of security policies implemented in SoC during deployment.

In order to develop a patchable security architecture, an SoC security policy can be effectively implemented as a sequence of commands that specify how to react to certain behavior of the IPs and inputs. These commands can be implemented on a separate, centralized IP, which communicates with the different IPs in the SoC design through a standardized interface protocol. An objective of the communication is to identify the security state of the system, determine if a requested access for a sensitive asset at the current state violates a security requirement, and if so, perform mitigatory actions. The architectural components described herein can be used to implement SoC security policies in a way that is seamlessly configurable infield.

In some embodiments, implementing SoC security policies can be achieved by at least one event frame being communicated from at least one security wrapper to a reconfigurable security policy engine (RSPE) comprising a field-programmable gate array (FPGA). At least one security wrapper can be configured to detect at least one event and communicate at least one event frame. The RSPE can evaluate a security state based at least in part on a mapping of at least one security policy and the at least one event frame from the at least one security wrapper of the plurality of security wrappers. At least one action can be implemented once the security state is evaluated. The action can be implemented by generating an output control signal. In some cases, the output control signal embodies instructions from the RSPE to a particular security wrapper of the plurality of security wrapper.

Further, the mapping can be generated based at least in part on a selection of a subset of a plurality of pareto-optimal mapping solutions associated with the at least one security policy. Further, a patch or an update that comprises an updated mapping can be received by the RSPE. The RSPE can also reconfigure at least one security wrapper to detect an event that is associated with the update.

In some examples, an apparatus that includes an SoC can include at least one IP core. An RSPE can implement at least one action based at least in part on configuration data that describes at least one security policy and at least one event frame. The RSPE can include an FPGA circuit. At least one security wrapper can be associated with the at least one IP core, and the at least one security wrapper can be configured to communicate the at least one event frame to the RSPE in response to at least one event. In some cases, the security wrapper can be configured by the RSPE at boot time based at least in part on the at least one security policy.

Further, the at least one IP core can include a first IP core and a second IP core. A first security wrapper for the first IP core can be configured to communicate a first event frame to the RSPE in response to a first event. A second security wrapper for the second IP core can be configured to communicate a second event frame to the RSPE in response to a second event. The RSPE can implements the at least one action based at least in part on the security policy, the first event frame, and the second event frame.

A design-for-debug (DfD) infrastructure comprising a respective DfD module for the at least one IP core can be configured to detect an event and communicate the event data to a particular security wrapper of the at least one security wrapper, in response to detection of the event. In some cases, the DfD infrastructure utilizes a dedicated port for event data that is different from a debug trace port. Instructions for the DfD infrastructure to detect the event and communicate the event data to the particular security wrapper can be communicated by the RSPE using an interface of the DfD infrastructure in order to configure the DfD infrastructure.

In some cases, a memory can store the configuration data, and the configuration data can include a bitstream that configures the FPGA or a bytestream that configures the FPGA. In one example, the at least one action causes a security wrapper of the at least one security wrapper to disable access to at least one register based at least in part on the at least one event frame.

This infrastructure enables efficient validation of the security policies implemented in RSPE using various validation approaches. In addition to implementing diverse SoC security policies, RSPE can also act as a centralized, reconfigurable, and plug-and-play IP block to protect against various attacks on the SoC hardware (e.g. scan-based controllability/observability attacks, hardware Trojan attacks, counterfeiting attacks, side-channel attacks). Protection against these attacks at the IP level often does not scale at the SoC level. RSPE can provide a centralized configurable hardware to effectively protect against these attacks at SoC level. The FPGA in RSPE can be configured to implement specific countermeasures for these attacks. RSPE can interface with the security wrappers of the IP blocks, which are built on the IEEE 1500 Standard test wrappers for the IPs, to control/observe internal signals in IP to implement a specific countermeasure. The security functions implemented in RSPE can be designed to comply with IEEE 1500 Standard for Embedded Core Test (SECT). For example, a Master Finite State Machine (M-FSM) that controls the working mode of RSPE, a Scan Chain Enabling FSM (SE-FSM) to provide individual control over activation of scan chains in the SoC, and a clock control module to generate necessary clock and control signals can be mapped to the FPGA inside the RSPE for performing scan chain authentication (to prevent scan based attacks), generating chip fingerprints using scan chain (for detecting counterfeit chips), programmable noise injection for side-channel attack resistance, and path delay or supply current based hardware Trojan detection.

FIG. 1 illustrates an example SoC 100 that includes a Reconfigurable Security Policy Engine (RSPE) 103. The SoC 100 also includes a number of individual IP cores (IPs) or hardware modules. The hardware modules of the SoC 100 include a CPU 106, a GPU 109, a DMA 112, a Memory 115, an FFT Engine 118, an I/O 121, a Ram Controller 124 and a Design-for-Debug (DfD) module 127. A security wrapper or communication wrapper can be used to interface or interact with each of the hardware modules. The security wrapper can, for example, utilize a wrapper standard or architecture such as IEEE P1500, or others.

The RSPE 103 can implement actions based on a security policy or multiple security policies. The RSPE 103 can include an FPGA circuit that can evaluate logic states. Accordingly, the RSPE 103 can be configured using data that describes the security policies as logic states. In some cases, the data can be stored and loaded into the RSPE 103 from the memory 115.

Each hardware module can have a security wrapper. The security wrappers for the hardware modules can communicate security-critical signals from the various hardware modules to the RSPE 103 in response to detected events. In some cases, the security wrappers can be configured by the RSPE 103 at boot time based on the security policies and its own configuration. In this way, a hardware update or patch can be applied to the RSPE 103, which can in turn configure the security wrappers.

Generally, the state machine for a specific policy enforcement can include (1) receipt of events from the various security wrappers; (2) computation of the system security state; and (3) asserting/de-asserting various output control signals. In the RSPE 103, a data buffer can store corresponding event frames from different IP blocks. The corresponding buffer control logic flags the appearance of "new events" to the RSPE 103. Consequently, a new input event frame read from the buffer memory coupled with the consequent computations would signify the definition, requirement, and implementation of a security policy. This permits a systematic extraction of the state machines of security policies from the software/firmware implementation, which can then be converted to a typical hard-logic state machine for the chosen embedded FPGA architecture.

Figure 2:
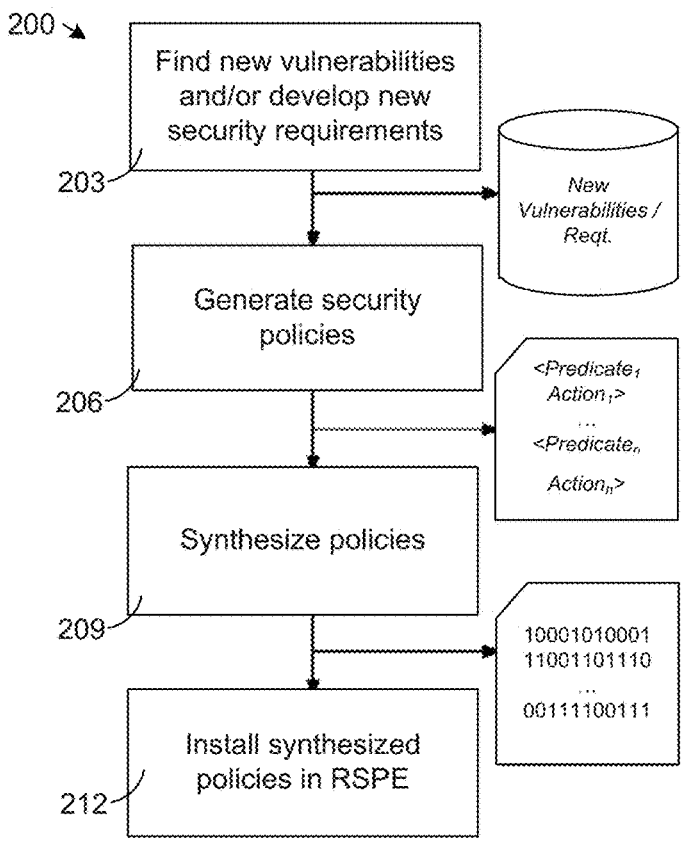
FIG. 2 illustrates an example flowchart of security policy implementation using an RSPE, according to the present disclosure.

FIG. 2 illustrates a flowchart 200 of an example of security policy implementation using an RSPE. Generally, the flowchart 200 can include manual and automatic actions and can in some cases be performed using a computing device such as a computer system that includes a processor and a memory. While referred to in the singular, multiple such computing devices can be utilized.

In box 203, new vulnerabilities or new security requirements can be formulated. For example, vulnerabilities can be found or discovered based on new attacks. In some cases, the data regarding the new security requirements or new vulnerabilities can be received or obtained, and stored in a memory.

In box 206, security policies can be generated. The security policies can be generated to include predicates (e.g., events or conditions), controls or actions, timing information, and other security policy data. The security policies can be generated or described based on the vulnerabilities that are found, or new security requirements that are received. For example, microcontroller implementation of policies can be written, or security policies can be provided in a programming language description or another form or notation such as XML or others.

In box 209, the security policies can be synthesized into a bitstream, bytestream, or other programming or configuration data for the RSPE, which can include an FPGA. For example, microcontroller implementations, programming language descriptions, or other software implementations of policies can be synthesized systematically to FPGA configuration data such as a bitstream or a bytestream.

In box 212, the configuration data can be installed to the RSPE. For example, configuration data can be remotely installed in the RSPE, or a memory can be remotely updated with new or updated configuration data, and the RSPE can load the updated bit configuration data. Accordingly, the FPGA of the RSPE can be fully or partially reconfigured.

Figure 3A:
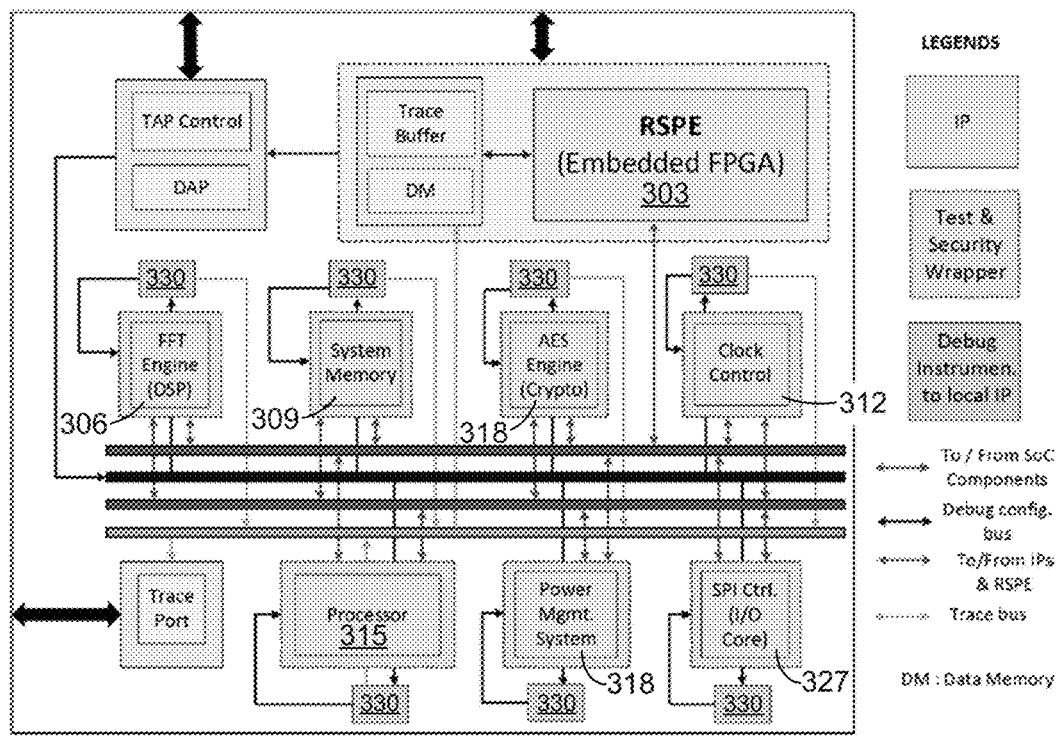
FIG. 3A illustrates an example SoC that includes an RSPE and local Design-for-Debug (DfD) modules, according to the present disclosure.

FIG. 3A shows a SoC 300 that includes a RSPE 303. The SoC 300 also includes a number of individual IP cores or IP blocks (or IPs). The IP Cores of the SoC 300 include a FFT Engine IP 306, a system memory IP 309, a clock control IP 312, a processor IP 315, an AES engine IP 318, a TAP controller IP 321, a power management IP 324, and an SPI controller IP 327. A security wrapper or communication wrapper can be used to interface or interact with each of the IP cores. The security wrapper can, for example, utilize a wrapper standard or architecture such as IEEE P1500, or others. In some cases, security wrappers can further include local (IP-level) modification of DfD logic, for example, by including debug instrumentation or DfD hardware module 330 local to each of the IPs. Events of interest for the IP are programmed by the RSPE via the configuration register interface of the corresponding DfD hardware module 330.

The RSPE 303 implements commands enforcing the security policies, and acts as the "security brain" of the SoC 300. It receives communication of relevant security events from the communication wrappers, identifies the security state based on these events, and enforces mitigatory actions based on the enforced policy.

In order to implement security policies, the RSPE 303 can be notified or communicated with data regarding some of the internal events of each IP and communications among IPs. This is achieved by the communication wrappers, which extend the debug and test wrappers already present for functional verification. The wrappers are programmable, so that they can be configured to monitor and control different sets of signals. RSPE 303 configures the wrappers during boot for monitoring signals necessary to enforce the implemented security policies; during execution, RSPE 303 identifies the security state of the system from the monitored signals, and if a policy violation is detected, can perform mitigatory actions.

Architecture of RSPE 303 can be accomplished using embedded FPGA. In addition to performance and power gains, FPGAs can streamline the design, e.g., by obviating the need for a large instruction memory for small number of policies. Furthermore, embedded FPGA deployments can be utilized in an SoC design with methodologies that can be exploited for the proposed security architecture.

Figure 3B:
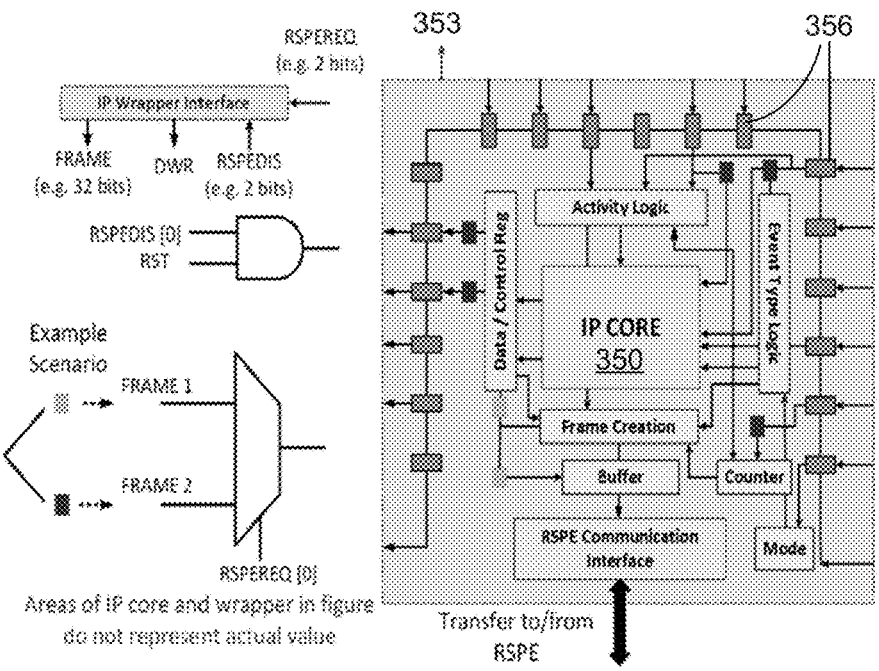
FIG. 3B illustrates an example IP core that includes a security wrapper.

FIG. 3B illustrates an example IP core 350 that includes a security wrapper 353. The security wrapper 353 includes a number of wrapper cells 356 that can, for example, utilize a wrapper standard or architecture such as IEEE P1500, or others. In some cases, the elements shown for the security wrapper 353 for the IP core 350 can be included in any of the security wrappers discussed.

A security buffer interfaces with the RSPE through a buffer controller that defines how the buffer frames are analyzed by the RSPE. The buffer storage is implemented through a standard static segmentation scheme, permitting variable-length segments based on the volume of metadata. The IP-buffer control logic maintains synchronization and coherence of the security wrapper and Policy Engine with data frame from IPs with different read and write speeds, segment sizes, and event frequency.

As compared with test wrappers, "smartness" is incorporated in the security wrappers to detect security-critical events of interest in the IP while providing both a standard communication interface between the IP and the SPE and a standard template-based design that can be easily integrated on top of the IP implementation. One observation is that IPs in a SoC can be divided into a small collection of broad categories and security-critical events. For instance, "Memory IPs" include all IPs controlling the access to different memory hierarchies, e.g., memory controllers, Direct Memory Access (DMA) modules, cache controllers, flash control logic etc., and processor cores include general purpose CPUs, GPUs, as well as cores controlled by microcode/firmware e.g., Ethernet, UART controller, audio, video cards etc. Any event is associated with metadata or event data which contains sufficient information about the event, e.g., DMA access details can be analyzed from page size, DMA burst size, address range etc. This event data is communicated by the security wrapper to RSPE, often under request from the RSPE. In addition to standardized events, there are some IP-specific requirements in each IP. The framework allows the SoC integrator to request additional security-critical events from specific IP which can then be mapped into its security wrapper.

Security Wrapper Implementation. The smart security wrapper design is frame-based, with a standard format for security-critical event definitions, which can be instantiated into corresponding events for specific IPs. The "smart" security wrapper can include an activity monitor logic (to identify whether the IP is active), an event type detector, and a buffer to store the event metadata. Some events also require corresponding local clock domains. The security wrapper incorporates registers that are configured by RSPE at boot time to specify particular events which need notification. The frame-based interface is used to provide a standardized communication mechanism with RSPE. RSPE can generally provide two types of signals to a security wrapper: (1) disable to block IP functions (in varying granularity depending on policy) in response to a suspected security compromise, and (2) request to request more data or send control signals. The existing boundary scan interface of the IP is exploited to transmit data in parallel shift/access mode in high bandwidth demands for functional security validation.

Figure 4:
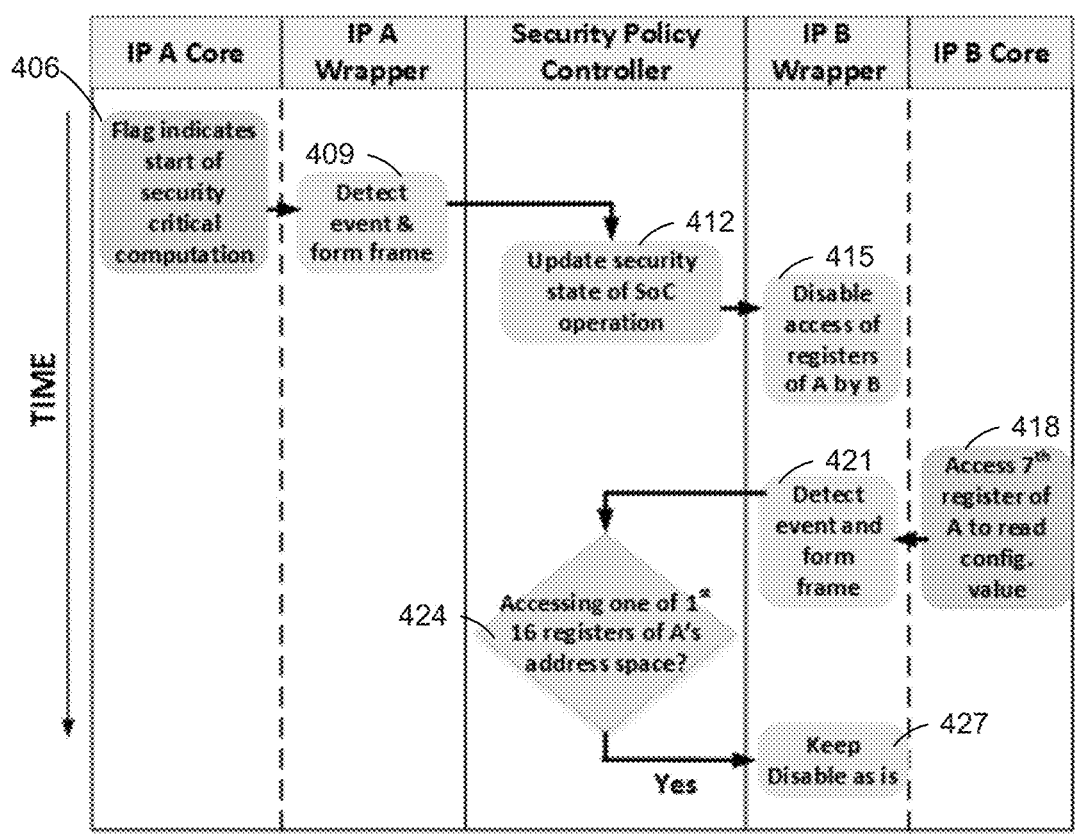
FIG. 4 illustrates an example sequence diagram of security policy implementation using an RSPE, according to the present disclosure.

FIG. 4 illustrates an example policy 403 implemented using an architecture that includes an RSPE and a number of IPs, much like that of FIG. 3A. For simplicity, this example refers to an IP core A (IP A) and an IP core B (IP B). The policy can prohibit access of first 16 (address-wise) internal registers of IP A by IP B when IP A is performing a specific security-critical computation. To enforce the policy, the RSPE can be apprised of or notified when IP B attempts to access particular local registers of IP A, as well as the security state of the computation being performed by IP A at that instant. An example operation flow is shown.

In box 406, IP A starts a security critical computation as indicated by a status flag. The status flag can be communicated to, or can be otherwise accessible to, the security wrapper A of IP A.

In box 409, the corresponding security wrapper A detects the event and communicates it with the RSPE using a frame, or a number of bits. The security wrapper A can detect the status flag that indicates the security critical computation. In some cases, this can be an event that is defined in the configuration or programming of the security wrapper A that causes it to generate an event frame and communicate the frame to the RSPE.

In box 412, the RSPE evaluates the frame and updates the security state of the SoC. This evaluation can be performed based on the security policy. In box 415, the RSPE disables accesses to all (or some) registers of IP A by IP B through control logic in IP B's security wrapper B, based on the security policy.

In box 418, IP B can attempt to access a register bit (e.g., register 7) in A's address space to read a configuration value. In box 421, the security wrapper B of IP B detects this event of interest and generates a frame or other event data. The Security wrapper B can then communicate the event data to the RSPE (e.g., using a frame).

In box 424, the RSPE, can determine that the request of IP B is a violation of the policy, and can deny corresponding access and maintains the disable status as it is, in IP B's security wrapper, as shown in box 427. In other words, the RSPE can evaluate multiple frames from multiple IP cores, and can generate control signals or otherwise communicate instructions to a particular security wrapper based on the evaluation of the frames received and the security policy.

The centralized location of all security policy implementation can be within the RSPE, which can allow the architecture to support infield patching. Consequently, in contrast to existing technologies, infield patching of security requirements with this architecture only requires updating the commands implemented in RSPE. This can be seamlessly performed by implementing the RSPE on a reconfigurable hardware such as FPGA, as discussed further below. Note that security wrappers do not need update even when the policies are changed infield. Since they are programmable or configurable at boot time by RSPE, an update only requires re-programming them to observe and control a potentially different set of signals that correspond to the updated policies. This flexibility can be achieved by security wrappers that monitor the new signals required by the updated policies (and hence available for reprogramming). The situation when that assumption does not hold is also discussed below. One aspect of the usage of the above architecture to implement infield patchability is to ensure that new signals as necessary for updated security policies can indeed be made accessible to RSPE. To address this, the architecture can interface with the extensive on chip Design-for-Debug (DfD) interface already available. Note that one purpose of DfD is to provide access and control to signals that enable triage and diagnosis of an unanticipated bug in field. Consequently, this interface can provide access to an extensive set of observable and controllable signals which can now be repurposed to enforce updated security policies. Smart security wrappers can further be architected for each IP by exploiting DfD to identify relevant security-critical events. On detection of such an event, DfD can communicate the information to the IP security wrapper that communicates it to the centralized RSPE. To enable this functionality without hampering debug usages for the DfD, local (I P-level) modification of DfD logic and appropriate adaptation of the security wrapper can be used.

This may entail additional hardware requirements. In particular, noninterference with debug usage, for example system energy/power constraints, can be achieved using transmission of security data to SPC via a separate port (instead of re-purposing the debug trace port and bus), which can be achieved using an additional trigger logic.

Events of interest for the IP are programmed by the RSPE via the configuration register interface of the corresponding DfD module. Nevertheless, the additional hardware can be less significant and the interface can provide a high programmability to security wrappers and can enable seamless infield reconfiguration.

tom accelerators), there are robust embedded FPGA deployments in an SoC design with established methodologies that can be exploited for the security architecture. Finally, protection of policy implementation against piracy, cloning, or counterfeiting—a big challenge in IoT devices permitting physical access infield, —can be mitigated by FPGA bitstream protection mechanisms and can utilize bitstream obfuscation, authentication, and mutable FPGA architectures being designed for security, without requiring enforcement of complex firmware update protocols for policy upgrade and protection.

TABLE 1

Representative SoC Security Policies Implemented on the Proposed Architectures.

| Policy# | Predicate Part | Action Part | IPs Involved |
|---|---|---|---|
| 1 | User mode & (Mem RD/WR Req. by User \| Mem RD/WR Req. by IP A \| . . . ) | RD/WR Addr. within specified range | DLX µP & any other IP with access to system memory |
| 2 | Supervisor mode & (Mem RD Req. by User \| Mem RD/WR Req. by IP A \| . . . ) | RD Addr. within shared memory range & No WR | DLX µP & any other IP with access to system memory |
| 3 | Debug mode & (Trace cells busy \| power mgmt. module busy) | No update in power control firmware & no changes in SPI controller Config. Reg. | Power mgmt. module & SPI controller |
| 4 | !(Supervisor mode) & (Inst. Mem Update Req. through test access port or SPI controller) | No update of Inst. Mem. allowed | DLX µP |
| 5 | Active Crypto mode | No interrupt or Memory Access Req. from the DLX core or any IP is allowed | Crypto module, processor and other IPs access to processor |

RSPE provides reconfigurability by defining a centralized point of policy implementation. Since RSPE implements commands that enforce various security requirements and mitigatory actions, one implementation might be through a microcontroller unit (MCU) where the policies are implemented through firmware. However, such an implementation may not satisfy performance and energy costs, which may be particularly relevant for automotive, highway control, and infrastructure systems. In particular, in an MCU implementation, execution consequently incurs the usual overhead of a software implementation. To comprehend that cost, an initial MCU implementation of security policies on an SoC design and an implementation of a set of 25 representative security policies can be integrated. Table 1 shows some of the illustrative policies implemented. As will be described, the cost can be almost an order of magnitude or more. This makes the MCU implementation unsuitable as a vehicle for practical hardware patching.

This problem can be addressed by making use of embedded FPGA to implement RSPE. In addition to performance and power gains, FPGAs can also streamline the design, e.g., by obviating the need for a large instruction memory when the number of policies is small. Note that for an MCU implementation, even if the number of currently implemented policies is small, one may need to reserve a significant instruction memory to support future extensibility. Furthermore, with embedded FPGAs used significantly in SoC designs particularly for IoT applications (e.g., as cus- A systematic approach for synthesizing diverse security policies into the embedded FPGA-based reconfigurable security policy engine (i.e. the RSPE block) can be implemented. Features of the framework can include: (1) it is amenable for automatic synthesis of arbitrary policies if the policies are described in specific predicate-action format, as shown in Table 1, and when the required observable and controllable signals are accessible to the reconfigurable security policy engine; (2) it explores the design space to obtain an energy optimal implementation of the policies and meet their performance specifications; (3) it allows incremental mapping of policies using partial reconfiguration for field upgrade of policies; and (4) it integrates to the existing FPGA synthesis flow and makes use of application mapping tools.

Figure 5:
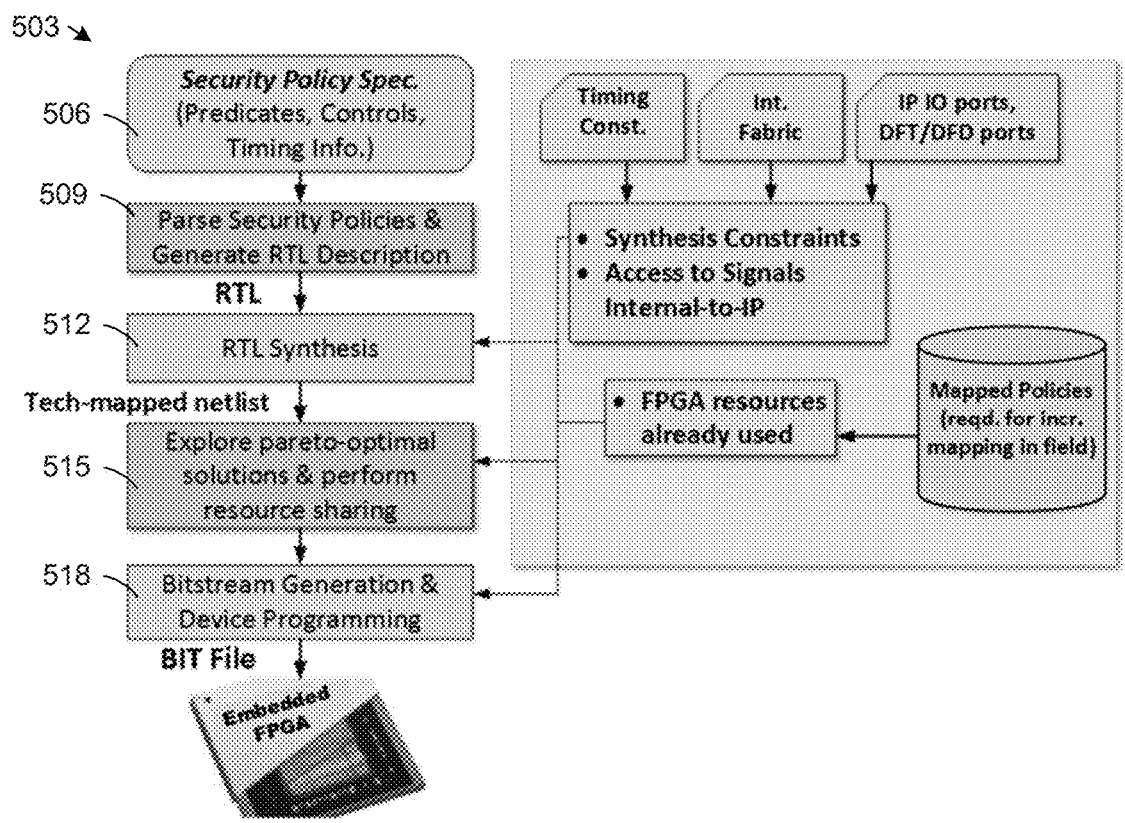
FIG. 5 illustrates an example flowchart for synthesizing a security policy mapping for an FPGA-based RSPE, according to the present disclosure.

FIG. 5 illustrates an example flowchart 503 for synthesizing a security policy mapping for an FPGA-based RSPE. It can integrate into FPGA synthesis flow. While the security policy can be referred to in the singular, the security policy discussed in FIG. 5 can be representative of multiple such security policies that can be obtained, processed, and ultimately evaluated and enforced using the RSPE architecture described.

In box 506, a security policy can be received or obtained that can include predicates (e.g., events or conditions), controls or actions, timing information, and other security policy data that is relevant to evaluation of an SoC security policy.

In box 509, a pre-compilation stage can be included, where a security policy or multiple security policies are parsed, and a register-transfer level description of the security policy is created. The security policies can, in some cases, be described as 3-tuple (e.g., <timing, predicate, action>). The timing information can indicate either an operating mode or a timing information with respect to global clock. For example, in case of policy 1 and 3 in Table 1, the timing information is represented as the operational mode for the DLX processor (user mode) and the operational mode of whole SoC (debug mode), respectively. The predicate information indicates specific conditions based on the IP-internal observable signals or property of the interconnection fabric.

As shown in Table 1, the condition can be expressed as a logical operation between multiple observable signals. For example, in case of the first policy, the predicate is formed by OR-ing two or more signals (e.g. Mem RD/WR Req. by User, Mem RD/WR Req. by IP A). The timing information can also be AND-ed with the predicate to create a combined condition. The third element in the 3-tuple is the action to be taken when the joint condition is true. This is done by asserting/de-asserting one or more signals or performing specific checks on a set of variables. For example, in case of policy 1, the specific action is a check if the RD/WR address is within a range.

The 3-tuple policies are parsed and an equivalent Verilog RTL code can be generated by accounting for the information on IO ports for all IPs in the SoC, test/debug ports and interconnect fabric. The input/output for this RTL module can be defined by considering all required observable and timing signals as input and all variables which are controlled as outputs. Each policy can be represented as an "assign" statement if it does not require using a state elements and as a separate "always" block if it requires a state element. The RTL module representing a set of policies is then synthesized using an FPGA synthesis tool.

In box 515 a number of pareto-optimal mapping solutions are generated by considering the timing and other constraint for the policies. Resource sharing between several policies can be considered, in the implementation of the predicate logic. This can optimize the area/energy requirement of the mapping under timing constraint. In case of incremental mapping of new set of policies on existing mapping of a set of policies using the partial mapping solutions provided by the commercial FPGA mapping tools, the information can be used on existing resource usage. From a set of pareto-optimal solutions, the best solution in terms of energy or area based on user preferences can be selected.

In box 518, the chosen or optimized solution can be used to generate device programming, such as a bitstream, bytestream, or other programming or configuration for an FPGA. The MCU implementation of policies can be synthesized systematically to FPGA; this provides a smooth path from an initial software implementation of policies (useful for early testing) to the FPGA implementation when the design matures.

A direct compilation of the MCU implementation to an RSPE FPGA implementation can incur significant overhead. A viable methodology can be achieved based on the observation that a security policy control engine represents a specialized finite state machine that interacts with the IPs of a system via a highly standardized protocol.

From the illustrative policy descriptions in Table 1, the state machine for a specific policy enforcement can be seen as a composition of the following steps: (1) receipt of events from the various security wrappers; (2) computation of the system security state; and (3) asserting/de-asserting various output control signals. In the RSPE microarchitecture, the data buffer stores the corresponding event frames from different IP blocks, the corresponding buffer control logic flags the appearance of "new events" to the policy execution engine (via for example a maskable interrupt). Consequently, a new input event frame read from the buffer memory coupled with the consequent computations would signify the definition, requirement, and implementation of a security policy. This permits a systematic extraction of the state machines of security policies from the software/firmware implementation, which can then be converted to a typical hard-logic state machine for the chosen embedded FPGA architecture.

Figure 6A:
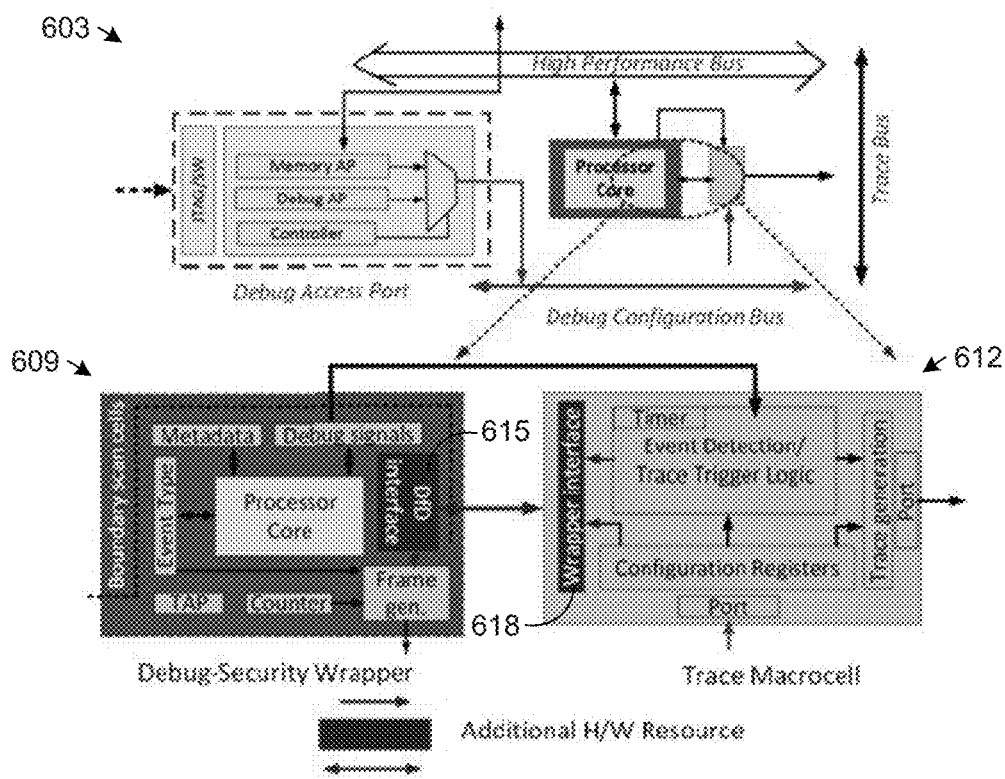
FIGS. 6A and 6B illustrate DfD hardware in an SoC that includes an RSPE, according to the present disclosure.

FIG. 6A illustrates an SoC 603 utilizing Design-for-Debug hardware 606 for security policy implementation. The SoC 603 includes a security wrapper 609 for an IP core that includes DfD hardware resources, and a local DfD hardware module 612 for the IP core. The security wrapper 609 exploits DfD infrastructure to identify relevant security-critical events. On detection of such an event, DfD communicates the information to the IP security wrapper, that communicates it to the centralized RSPE. To enable this functionality without hampering debug usages for the DfD, local (IP-level) modification of the DfD hardware module 612 and appropriate adaptation of the security wrapper 609 is implemented. The additional hardware resources for DfD implementation include a DfD interface 615 as part of the security wrapper 609, and a security wrapper interface as part of the DfD hardware module 612. Non-interference with debug usage especially system energy/power constraints, requires transmission of security data to RSPE via a separate port (instead of re-purposing the debug trace port and bus), which requires an additional trigger logic. The events of interest for the IP are programmed by the RSPE via the configuration register interface of the corresponding DfD hardware module 612. Since DfD hardware module 612 can be configured to detect a number of security events (related or disparate) at runtime, RSPE must correctly identify the corresponding event from the communication frame sent by the security wrapper. This interface is standardized across all local DfD/security-wrapper pairs, by tagging event information with the corresponding configuration register address. Trace packet generation controls can be disabled during RSPE access (resp., security-debug interface disabled during system debug) to save leakage power when debug (resp., security) architecture is not in use.

Figure 6B:
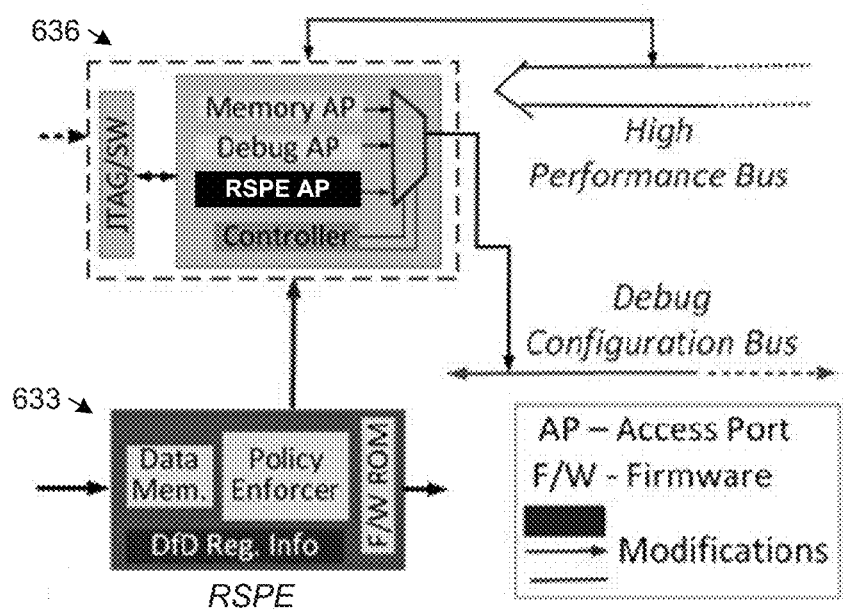

FIG. 6B illustrates the communication between an RSPE 633 and a DfD interface 636. The RSPE 633 must be able to configure the individual local on-chip debug logic to detect relevant security-critical events and assert appropriate controls. As used during system debug, the existing configuration bus (address and data) is used by RSPE 633 for trace cell programming. As there are usually enough configuration registers and associated logic in the local DfD components to monitor all possible security-critical events, the RSPE 633 can configure the trace cells with appropriate values at boot phase; therefore, the configuration fabric can be turned off during most times to save leakage power. In some rare scenarios, RSPE 633 cannot configure DfD for detection of all necessary events at boot; for these cases, RSPE 633 interfaces with the power management module to turn on the DfD interface 636 or Debug Access Port (DAP) and configuration bus at runtime.

Figure 7:
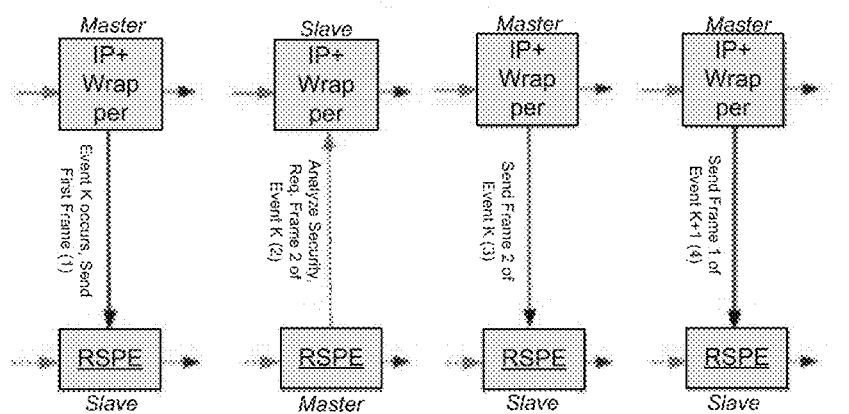
FIG. 7 illustrates an event frame and an example flow for security policy implementation using an RSPE, according to the present disclosure.
Figure 7:
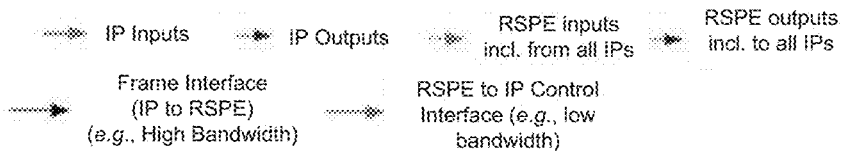

FIG. 7 illustrates an event frame 703 and an example communication 706 between a security wrapper and an RSPE. The event frame 703 can include A/I, indicating whether the IP is active or inactive; FL indicating a frame length; E_id, indicating an event ID with which the frame is linked; E_type, indicating a type of the event, and E_md, including metadata about the event. The communication 706 can show time sequence indicated by numbers 1-2-3 in time, and 4 can happen after 1, 2, or 3, based on when event K+1 of interest occurs, and specific design details of the IP and the RSPE as indicated in frames communicated to the RSPE and the configuration of the FPGA in the RSPE.

Experimental Results: The experimental results are obtained using an SoC model in Verilog RTL. It includes a DLX microprocessor core (DLX), a representative memory controller IP, a 128b FFT engine, a 128b AES crypto core as well as a Serial Peripheral Interface (SPI) controller, all obtained from open-source IP databases from Opencores (http://opencores.org). A 32 KB representative central system memory is incorporated too. To compare the approach with microcontrolled implementation, this SoC design can be augmented with the RSPE implementation obtained from previous experiments. This includes security wrappers for the IPs, as well as the microcontrolled implementation. The MCU used is a 32-bit DLX RISC core (5 typical pipeline stages) along with its corresponding instruction memory (for storing policies). A 4 KB data buffer, storing the in-coming IP event frames in different segments as well as providing scratchpad data memory for DLX core (policy control engine), is also added.

Twenty five representative security policies are implemented (cf. Table 1) with this SoC design, mostly different kinds of access control, as well as some instances of information flow, liveness, and secure boot. In absence of adequate memory models, all instruction/data storage is functionally implemented as register arrays. The entire framework has been functionally validated using ModelSim for typical policy use cases. All area, power and performance analysis have been performed using 32 nm technology library.

The experiments are conducted on a commercial stock Cyclone V FPGA since embedded FPGA IP cores are not available in open source. Cyclone V was chosen as it is manufactured at 28 nm technology and presents the opportunity to do a proper comparison with the processor core based RSPE at 32 nm without need of any normalization. The results are scaled wherever applicable e.g., since embedded FPGA would actually implement the RSPE inside the SoC if chosen, for power analysis using commercial FPGA device the I/O power was not considered and the area and static powers scaled corresponding to actual logic utilization factors, obtained from final compilation reports. The same 25 security policies are implemented in the FPGA logic. The 4 KB data buffer was kept as for RSPE, for storage of different IP events and serving as local data memory for FPGA during computations; however, the dedicated instruction memory is removed. For fair comparison with the MCU implementation, dedicated block RAMs are not used to represent data buffer in FPGA (only registers used in both cases), and also eschewed special compilation flags for area, performance, or power optimization.

Hardware patchability stipulates the detection of new events beyond initial design scope. It is infeasible to employ customized security wrappers for specific security polices when it comes to infield system reconfiguration and upgrade. In these experiments, the desired flexibility and scalability in event detection are achieved by exploiting the local DfD (Design-for-Debug) instrumentation pertaining to each IP block.

Signals can be categorized as observable and controllable based on the accessibility. A similar approach is taken while considering the controllable and observable signals from other IP blocks like DLX microprocessor, SPI, FFT etc.

An estimation of the total number of observable and controllable signals with different design specifications is provided in Table 2. TW, SW, DfD, and % Increment represent test wrappers, security wrappers, Design-for-Debug Infrastructure, and percentage increment of DfD over smart wrappers, respectively.

Table 2 depicts the observability and controllability of reconfigurable security policy engine over signals from various IP blocks in three different phases of the design, i.e. initial policy engine with test wrappers (TW), MCU-based Policy Engine with smart security wrappers (SW), and FPGA-based policy engine with Design-for-Debug (DfD) interface integrated with smart security wrappers.

The controllability and observability results are measured based on the accessibility of security policy controller engine to the respective signals via test wrappers, smart security wrappers, and DfD infrastructure. To calculate the additional signal observability and controllability by DfD, the accessibility of local debug modules are analyzed to signals emanating from different IP cores.

TABLE 2

Estimation of Observable and Controllable Signals

|  | IP Type | TW | SW | DfD | % Increment |
|---|---|---|---|---|---|
| Observable | DLX uP | 5 | 547 | 772 | 41.13 |
|  | AES | 5 | 386 | 776 | 101.04 |
|  | SPI | n/a | 104 | 161 | 54.81 |
|  | Mem. | 5 | 224 | 608 | 171.43 |
|  | FFT | 5 | 134 | 218 | 62.69 |
| Total |  | 20 | 1395 | 2535 | 81.72 |
| Controllable | DLX uP | 1 | 142 | 255 | 79.58 |
|  | AES | 1 | 107 | 188 | 75.7 |
|  | SPI | n/a | 75 | 144 | 92.00 |
|  | Mem. | 1 | 104 | 187 | 79.81 |
|  | FFT | 1 | 76 | 156 | 105.26 |
| Total |  | 3 | 504 | 930 | 84.52 |

The results signify the enhanced capability (in terms of observability and controllability) of DfD integrated RSPE over existing technologies. From the results, it is evident that DfD integration increases the potential number of observable and controllable signals of each IP blocks by a vast magnitude. The percentage increment in observability in DfD integrated design compared to security wrapper based architecture is as high as 171.43% for memory controller block. DfD infrastructure enhances the observability over the signals of DLX microprocessor by 41.13%. As for controllable signals, the percentage increment is 79.58% for the microprocessor core. The maximum increment in controllability is up to 105.26% for the FFT block.

TABLE 3

Estimation of Arbitrary Number of Security Policies

| Tuple Type | TW | SW | DfD | % Increment |
|---|---|---|---|---|
| 2P, 1A | 570 | 490046760 | 2987015850 | 5.10 |
| 4P, 1A | 14535 | 7.91E+13 | 1.59E+15 | 19.16 |
| 8P, 1A | 377910 | 1.75E+23 | 3.89E+25 | 220.42 |
| 8P, 1A | 377910 | 4.42E+25 | 1.81E+28 | 407.94 |

Table 3 provides a comparative estimation of the number of policies that can be implemented with DfD integrated RSPE and other designs. Table 3 illustrates the controllability and observability information obtained by comparing different designs. The estimated number of security policies is calculated based on the standard policy framework proposed in this work. Apart from the timing information, the primary policy-determining components of the framework are predicates and corresponding actions. In Table 3, P, and A represents predicate, and action, respectively. The observable signals from multiple IP blocks are considered to determine the possible number of predicates and exploited the controllable signals to assert control and set the constraint through the action tuple of the policy framework. Table 3 shows the maximum limit on the number of security policies in several case scenarios e.g. 2 predicates, 1 action; 4 predicates, 2 actions; 8 predicates, 2 actions etc. In every case, the DfD instrumentation results in a higher number of possible arbitrary policies compared to other designs.

TABLE 4

Area, Performance, Power and Energy vales for DLX processor core and embedded FPGA based RSPE module and calculated ratios for comparison between two approaches

|  | Die Area ($\mu m^2$) | Clock Frequency (MHz) | Cycle Count (10 policies) | Total Latency ($\mu s$) | Dynamic Power (mW) | Static Power (mW) | Total Energy (nJ) |
| --- | --- | --- | --- | --- | --- | --- | --- |
| DLX $\mu P$ | 0.724 | 203 | 210 | 1.04 | 14.27 | 63.48 | 80.86 |
| FPGA | 1.06 | 138 | 26 | 0.189 | 64.9 | 20.43 | 16.13 |
| Ratio | 0.68 | 1.47 | 8.07 | 5.49 | 0.22 | 3.11 | 5.02 |

Table 4 shows the comparative overhead results for the FPGA implementation over the microcontrolled version. The testbench exercises 10 of these policies in succession in a specific scenario. For the microcontroller implementation, between 15 and 20 instructions are involved in the execution of one policy. The estimated dynamic and static powers are based on the signal activities in the representative test bench and standard voltage and thermal models at available 32 nm technology library. The total energy is calculated as the total power (dynamic+static) multiplied by the total latency incurred for the ten policies.

For the FPGA implementation, the values of the parameters (die area, latency, total power, total energy) are calculated as follows. From the Quartus tool, after compilation of the design, the reported number of arithmetic logic modules (both partially and fully utilized ones) is multiplied by the corresponding ALM area to obtain the total die area. The same test bench (as used in MCU version) is utilized to annotate signal activities for dynamic and static power calculation. To mimic the overhead of embedded FPGA, the total reported static power (reported for the whole FPGA chip) is multiplied by the total logic utilization factor to obtain the contribution towards the net leakage power.

From Table 4, the FPGA implementation is around 5.02× more energy efficient than the corresponding core based implementation. Furthermore, the MCU implementation takes on average 5.5× the time compared to FPGA to execute these policies. The superior performance and energy efficiency are benefits of the FPGA implementation compared to microcontrolled architecture, particularly for IoT applications, since many IoT applications are energy constrained and also often require real-time security protection and mitigation.

vidual IP frames (standardized frame format). Besides, all of them incur 3 cycles (2 cycle read of corresponding event frame after buffer flag and 1 cycle execution to determine security state). In practice, policies may involve multiple cycle execution as well on the FPGA.

TABLE 6

Comparison of area overhead for the entire SoC

| SoC | Org. Area ($\mu m^2$) | $\mu C$ Design Overhead (%) | FPGA Design Overhead (%) |
| --- | --- | --- | --- |
| SoC Model | 13.1 × 10$^6$ | 21.7 | 30.74 |
| Apple A6 (APL0598) | 96.71 × 10$^6$ | 2.92 | 4.26 |
| Qualcomm Snapdragon 800 | 118.3 × 10$^6$ | 2.39 | 3.49 |

Furthermore, several policies can be executing together, resulting in significant overlapping of performance and energy costs. Nevertheless, the results provide a relative comparison of the FPGA implementation of various policies, and, in practice, may suggest targets for optimizations. Table 6 provides a comparison area overhead for the entire SoC between MCU version and the FPGA based RSPE implementation. It can be observed that even though FPGA area is 0.68× higher than MCU area, the total area overhead for realistic SoCs still less than 5%.

This disclosure presents an architecture and a CAD framework for implementing SoC security policies that accounts for the flexibility and infield updates as required by diverse applications. It further presents an automatic synthesis framework that enables mapping arbitrary security

TABLE 5

Results for execution of each policy in FPGA based RSPE

| | Security Policy No. | | | | | | | | | |
| --- | --- | --- | --- | --- | --- | --- | --- | --- | --- | --- |
| | P1 | P2 | P3 | P4 | P5 | P6 | P7 | P8 | P9 | P10 |
| Energy (nJ) | 1.865 | 1.842 | 1.851 | 1.876 | 1.861 | 1.839 | 1.846 | 1.85 | 1.868 | 1.875 |
| Latency (ns) | 21.74 | 14.48 | 7.24 | 21.74 | 14.48 | 2174 | 14.48 | 14.48 | 21.74 | 7.24 |
| Resources (ALMs) | 5465 | 4065 | 3260 | 5465 | 4065 | 4065 | 5465 | 4065 | 5465 | 3260 |

To provide a sense of the energy cost in FPGA for each individual policy, Table 5 provides a breakdown of energy consumption per policy. This is done by a testbench that executes each policy in isolation. Note that the energy costs across various policies are close. This is primarily because each policy represents some type of access control regulation and thereby involves similar computations on the indipolicies into this framework and integrates well with commercial tool flow. Significantly higher access to required signals and capability to implement vast number of arbitrary security policies with minimal overhead are distinct features of the proposed hardware-software solution. It simultaneously avoids the high performance and energy cost inherent in a software implementation of these policies. The described examples can provide an order of magnitude reduction in cost from performance, power, and energy overhead.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A system-on-chip, comprising:
an intellectual property (IP) core;
a reconfigurable security policy engine (RSPE) comprising a field-programmable gate array (FPGA) circuit, wherein the RSPE implements at least one action based at least in part on an evaluation of at least one event frame and configuration data that describes at least one security policy;
a security wrapper for the IP core comprising at least one wrapper cell, the security wrapper being communicatively coupled to the RSPE and configured to communicate an event frame to the RSPE in response to an event; and
a design-for-debug (DfD) infrastructure comprising a local DfD module for the IP core, wherein the DfD infrastructure interfaces with the RSPE and security wrappers, and is configured to detect the event and communicate event data to the security wrapper in response to detection of the event.

2. The system-on-chip of claim 1, wherein the security wrapper is configured by the RSPE at boot time based at least in part on the at least one security policy.

3. The system-on-chip of claim 1, wherein the event frame is a first event frame, the system-on-chip further comprising:
a second IP core; and
a security wrapper for the second IP core that is configured to communicate a second event frame to the RSPE in response to a second event, wherein the evaluation of the at least one event frame comprises evaluating the first event frame and the second event frame.

4. The system-on-chip of claim 1, wherein the RSPE evaluates a security state based at least in part on a pareto-optimal mapping of the at least one security policy and the event frame.

5. The system-on-chip of claim 1, wherein the DfD infrastructure utilizes a port for event data that is different from a debug trace port of the DfD infrastructure.

6. The system-on-chip of claim 1, wherein instructions for the DfD infrastructure to detect the event and communicate the event data to the security wrapper are communicated by the RSPE using an interface of the DfD infrastructure in order to configure the DfD infrastructure.

7. The system-on-chip of claim 1, further comprising a memory that stores the configuration data, wherein the configuration data comprises a bitstream that configures the FPGA circuit or a bytestream that configures the FPGA circuit.

8. The system-on-chip of claim 1, wherein the at least one action causes a wrapper cell to disable access to a register based at least in part on the at least one event frame.

9. A method, comprising:
detect an event using a design-for-debug (DfD) infrastructure comprising a local DfD module for an intellectual property (IP) core, wherein the DfD infrastructure provides event data to at least one security wrapper based on the event being detected;
communicating at least one event frame from the at least one security wrapper of a plurality of security wrappers to a reconfigurable security policy engine (RSPE) comprising a field-programmable gate array (FPGA), wherein the plurality of security wrappers are configured to detect at least one event and communicate the at least one event frame;
evaluating, by the RSPE, a security state based at least in part on a mapping of at least one security policy and the at least one event frame from the at least one security wrapper of the plurality of security wrappers; and
implementing, by the RSPE, at least one action in response to evaluating the security state, wherein the at least one action is implemented by generating an output control signal.

10. The method of claim 9, wherein the output control signal embodies instructions from the RSPE to a particular security wrapper of the plurality of security wrappers.

11. The method of claim 9, further comprising generating the mapping based at least in part on a selection of a subset of a plurality of pareto-optimal mapping solutions associated with the at least one security policy.

12. The method of claim 9, further comprising:
receiving, by the RSPE, an update that comprises an updated mapping; and
reconfiguring, by the RSPE, at least one of the plurality of security wrappers to detect an event that is associated with the update.

13. An apparatus, comprising:
at least one IP core;
a reconfigurable security policy engine (RSPE) comprising a field-programmable gate array (FPGA) circuit, wherein the RSPE implements at least one action based at least in part on at least one event frame and configuration data that describes at least one security policy;
at least one security wrapper associated with the at least one IP core, the at least one security wrapper being configured to communicate the at least one event frame to the RSPE in response to at least one event; and
a design-for-debug (DfD) infrastructure comprising a respective DfD module for the at least one IP core, wherein the DfD infrastructure is configured to detect the at least one event and communicate event data to a particular security wrapper of the at least one security wrapper.

14. The apparatus of claim 13, wherein the at least one security wrapper is configured by the RSPE at boot time based at least in part on the at least one security policy.

15. The apparatus of claim 13, wherein the at least one IP core comprises:
a first IP core, wherein a first security wrapper for the first IP core is configured to communicate a first event frame to the RSPE in response to a first event;
a second IP core, wherein a second security wrapper for the second IP core is configured to communicate a second event frame to the RSPE in response to a second event; and
wherein the RSPE implements the at least one action based at least in part on the at least one security policy, the first event frame, and the second event frame.

16. The apparatus of claim 13, wherein the RSPE evaluates a security state based at least in part on a pareto-optimal mapping of the at least one security policy and the at least one event frame.

17. The apparatus of claim 13, wherein the DfD infrastructure utilizes a port for event data that is different from a debug trace port.

18. The apparatus of claim 13, wherein instructions for the DfD infrastructure to detect the event and communicate the event data to the particular security wrapper are communicated by the RSPE using an interface of the DfD infrastructure in order to configure the DfD infrastructure.

19. The apparatus of claim 13, further comprising a memory that stores the configuration data, wherein the configuration data comprises a bitstream that configures the FPGA circuit or a bytestream that configures the FPGA circuit.

20. The apparatus of claim 13, wherein the at least one action causes a security wrapper of the at least one security wrapper to disable access to at least one register based at least in part on the at least one event frame.

* * * * *